United States Patent [19]
Rancourt et al.

[11] Patent Number: 4,846,551
[45] Date of Patent: Jul. 11, 1989

[54] OPTICAL FILTER ASSEMBLY FOR ENHANCEMENT OF IMAGE CONTRAST AND GLARE REDUCTION OF CATHODE RAY DISPLAY TUBE

[75] Inventors: James D. Rancourt, Santa Rosa; John S. Matteucci, Healdsburg; Michael W. Andreasen, Calistoga, all of Calif.

[73] Assignee: Optical Coating Laboratory, Inc., Santa Rosa, Calif.

[21] Appl. No.: 183,375

[22] Filed: Apr. 11, 1988

Related U.S. Application Data

[63] Continuation of Ser. No. 853,986, Apr. 21, 1986, abandoned.

[51] Int. Cl.$^4$ ............................. G02B 5/28; G02B 1/10
[52] U.S. Cl. ..................................... 350/166; 350/164; 427/126.6; 427/162; 427/163
[58] Field of Search ..................... 350/164, 165, 166; 427/162, 163, 164, 126.1, 126.6

[56] References Cited

U.S. PATENT DOCUMENTS

| | | | |
|---|---|---|---|
| 3,516,720 | 6/1970 | Mauer | 350/165 |
| 3,576,356 | 4/1971 | Hyman | 350/164 |
| 3,804,491 | 4/1974 | Morokuma et al. | 350/164 |
| 3,935,351 | 1/1976 | Franz | 350/164 |
| 4,132,919 | 1/1979 | Maple | 350/164 |
| 4,161,547 | 7/1979 | Kienel | 350/164 |
| 4,333,983 | 6/1982 | Allen | 350/166 |
| 4,387,960 | 6/1983 | Tani | 350/164 |
| 4,465,337 | 8/1984 | Baron et al. | 350/164 |

Primary Examiner—Bruce Y. Arnold
Assistant Examiner—Martin Lerner
Attorney, Agent, or Firm—Flehr, Hohbach, Test, Albritton & Herbert

[57] ABSTRACT

An optical interference filter structure incorporates antireflectance and light absorbing elements disposed on a substrate. The filter structure is shaped to conform substantially to the face of a cathode ray tube or other luminous display, such as a cathode ray tube for example. The materials of the elements are selected for their characteristics including indices of refraction, light absorption and chromatic filtering so that in combination they provide optimum antireflectance, antiglare and image contrast features.

32 Claims, 2 Drawing Sheets

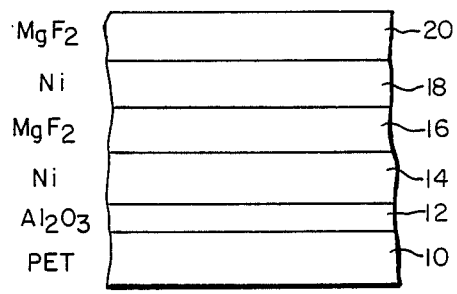
FIG.—1
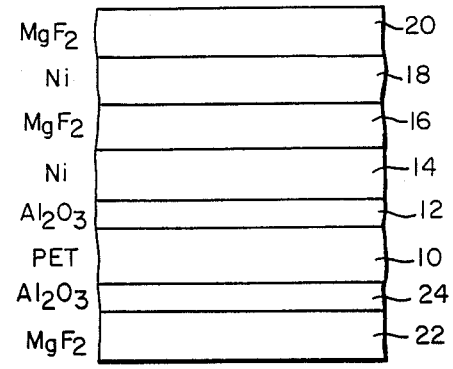
FIG.—2
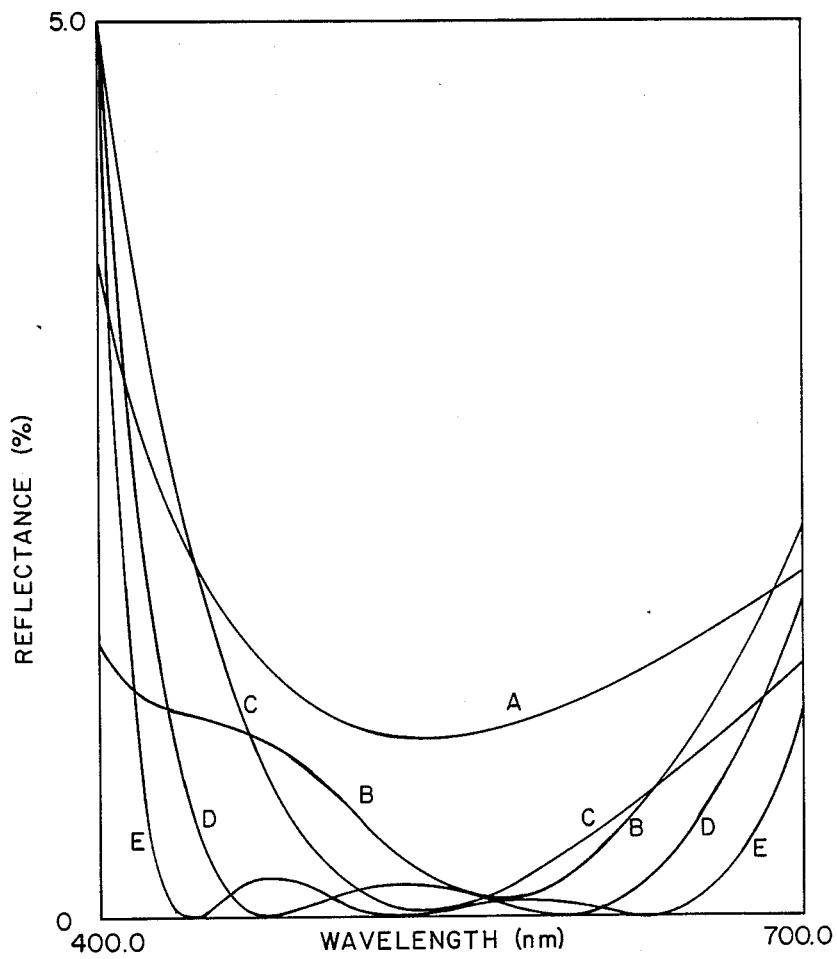
FIG.—8

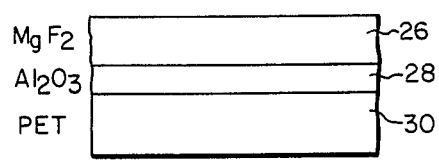
FIG.—3
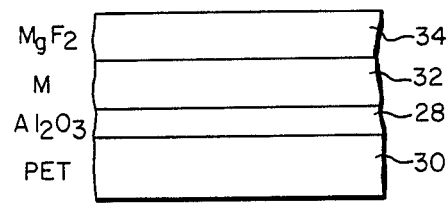
FIG.—4
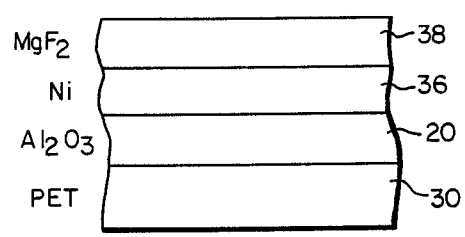
FIG.—5
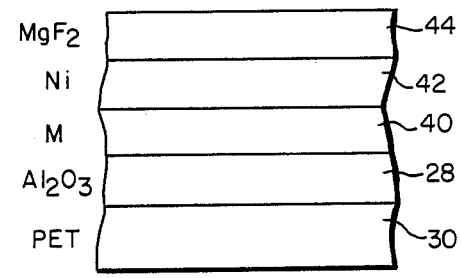
FIG.—6
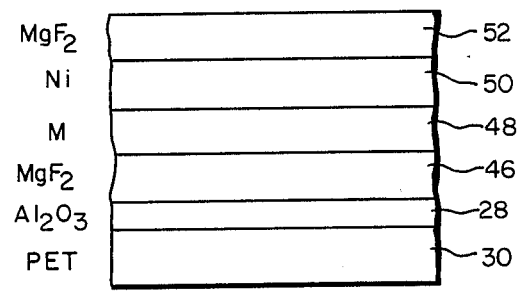
FIG.—7

OPTICAL FILTER ASSEMBLY FOR ENHANCEMENT OF IMAGE CONTRAST AND GLARE REDUCTION OF CATHODE RAY DISPLAY TUBE

TECHNICAL FIELD

This invention relates to an optical filter assembly and in particular to a filter assembly for improving the image of a cathode ray tube or other luminous display.

BACKGROUND OF THE INVENTION

Various self-luminous displays are used today for displaying data and images, such as employed for computers and television screens. The displays may be generated with cathode ray tubes, electroluminescent devices and plasma panels, among other things.

It is known that the average television viewer and computer operators spend many hours daily looking at display screens which present images and data, including graphics and alphanumeric symbols, among other things. There are significant problems that may occur when watching a display screen over a long period of time. One problem is reflection of objects external to the display tube that appear to be superimposed on the display image and also produce undesirable glare. This can occur during daylight hours when a window facing the display face appears as a reflection, by way of example, or at other times when light bulb radiation impinges on the display screen face. Another problem is evidenced when image contrast is low and the image does not appear to be sufficiently sharp to the viewer. As a result, the viewer's eyes are deleteriously affected and tend to become tired, which may lead to poor work performance or other undesirable effects.

CROSS-REFERENCE TO RELATED PATENT

U.S. Pat. No. 4,333,983, which issued June 8, 1982 in behalf of T. A. Allen and is assigned to the same assignee, discloses an optical coating assembly incorporating a flexible polymer substrate that is coated with an aluminum oxide thin film to a defined thickness, and an optical coating formed on the aluminum oxide film. The optical coating is made of at least one layer of magnesium fluoride formed to a predetermined optical thickness. The aluminum oxide thin film serves as an adhesive layer to ensure that the optical coating adheres to the polymer substrate, and is relatively hard to afford durability to the assembly. The optical coating enhances the antireflectance of the assembly.

The present invention discloses an improvement of the patented optical coating assembly, and substantially enhances the antireflectance characteristic of an optical filter to reduce glare which is generally experienced with self-luminous displays, and significantly improves the contrast of the images and data which are displayed.

SUMMARY OF THE INVENTION

An object of this invention is to provide an optical filter assembly for use with cathode ray tubes and other self-luminous displays whereby reduced glare and improved image contrast are realized.

Another object of this invention is to provide an optical filter assembly that is easily positioned in juxtaposition with a face of a display device to achieve optical filtering and enhanced light image transmission.

Another object is to provide an optical filter assembly that resists humidity and is highly durable.

For purpose of explanation, the description hereinafter will be directed to a cathode ray tube display, although the invention is not limited thereto, but is applicable to self-luminous displays in general.

In accordance with this invention, an optical filter assembly comprises a transparent plastic substrate having front and rear surfaces. The filter assembly is configured to match substantially the configuration of the face of the display tube with which it is to be associated for improving image contrast and for minimizing glare resulting from reflection of externally illuminated objects. A multilayer optical coating, which is formed of layers of substantially transparent thin metal films interleaved with films of material having a low index of refraction, such as magnesium fluoride, is deposited on the front surface of the plastic substrate. The multilayer coating has optical characteristics that reduce reflectance and glare and enhance the contrast of the display image.

In an alternative embodiment, in addition to the optical coating deposited on the front surface of the substrate, an optical coating formed of a material having a low index of refraction, such as magnesium fluoride, is deposited on the rear surface of the substrate to enhance antireflectance. In each embodiment, a hard coat of alumina is utilized preferably to provide adherence between the plastic substrate and the optical coating, as well as to improve the durability of the optical filter structure.

BRIEF DESCRIPTION OF THE DRAWINGS

The invention will be described in greater detail with reference to the drawings in which:

FIG. 1 is a sectional view of a multilayer optical filter useful with a cathode ray tube or other self-luminous display to provide image constrast and antiglare, in accordance with this invention;

FIG. 2 is a sectional view of an alternative embodiment of a multilayer optical filter, incorporating the novel features of this invention; and FIG. 3 depicts a simple optical filter using a single antireflectance layer;

FIG. 4 illustrates an optical filter incorporating a one-half wave achromatizing layer;

FIG. 5 represents a one period dark mirror optical filter;

FIG. 6 illustrates a one period dark mirror optical filter with an achromatizing one-half wave layer;

FIG. 7 shows a one period dark mirror optical filter with two achromatizing half-wave layers; and FIG. 8 is a series of curves to aid in the explanation of the invention, illustrating variations in reflectance with changes in wavelength of the light impinging on the optical filter of this invention. Similar numerals refer to similar elements throughout the drawings. The figures of the drawings are not drawn to scale, but illustrate the relationships of the several layers of the various optical filters.

DETAILED DESCRIPTION OF THE INVENTION

With reference to FIG. 1 an optical filter comprises a substrate 10 formed from a flexible transparent plastic or polymer, such as polyethylene terephthalate (PET) or polycarbonate. The substrate layer is about 0.003–0.007 inches in physical thickness depending upon the rigidity required, and the plastic material forming the substrate has an index of refraction in the range of about 1.5–1.8.

A thin film 12 of aluminum oxide is vacuum deposited on the front surface of the substrate to a thickness of at least 170 nanometers approximately, which is about ⅜ wave of optical thickness at a design wavelength of approximately 500 nanometers. This design wavelength is within the visible spectrum that extends from about 400–750 nanometers. Aluminum oxide has an index of refraction of about 1.65. The aluminum oxide thin film serves to enable a multilayer optical coating to be joined securely to the plastic substrate. The relatively inexpensive alumina hard coat 12 also improves the durability of the optical filter assembly so that the optical filter is made to be commercially feasible.

In one embodiment of this invention, a multilayer optical coating is deposited over the aluminum oxide film 12 to provide a light filter having antireflectance and antiglare features. The optical coating is formed, in this implementation, with two periods of dark mirrors, each period comprising two layers of different materials. The first layer 14 that is deposited on the aluminum oxide is a very thin film of a metal, such as nickel, having a thickness of about 13 to 80 Angstroms. The nickel film is light absorbing and acts to reduce reflectance and glare significantly. The second layer 16 of the first period consists essentially of magnesium flouride, which is deposited to a thickness equivalent to a quarter wave optical thickness at a design wavelength in the range of 500–650 nanometers that is substantially within the center of the visible spectrum. Magnesium fluoride has an index of refraction of about 1.38 and is a material that is nonabsorbing or antireflectance to light. The optical filter includes a second like pair of a thin film nickel layer 18 with a thickness on the order of 75 Angstroms and thin film of magnesium fluoride 20 deposited successively on the first pair of thin film layers. The second magnesium fluoride layer 20 has a quarter wave optical thickness at a design wavelength in the range of about 400–500 nanometers.

It has been established by test measurements that when using an optical filter coating on PET as disclosed above with a cathode ray tube display, only 0.5–0.8% of the integrated reflected light reaches the eyes of a viewer of the display, and that the integrated light transmittance of the image display is about 84%. Without the optical filter coating, 10–12% of reflected light reaches the viewer's eyes.

To use the optical filter, the layered structure is housed in a frame (not shown) and the completed filter assembly is either attached, by its frame with adhesive or other fastener for example, to the housing of the display tube. An alternative approach is to attach the optical filter directly to the glass surface with a two-sided adhesive element having an index of refraction similar to glass which is about 1.52. In such case, there is approximately an 0.2% reflectance from the display tube.

To enhance the antireflectance of the optical filter, the rear surface of the filter assembly, i.e., the surface which faces the display tube when in use, is coated with a single layer 22 of magnesium fluoride. An aluminum oxide layer 24 is deposited between the rear surface of the plastic substrate 10 and the magnesium fluoride thin film layer 22 to provide adherence of the coating 22 to the plastic. With this additional antireflectance coating, the two surface coated optical filter has a reflectance of only 0.1–0.2%.

With reference to FIG. 8, a series of curves A–E depict the percent reflectance plotted against the wavelengths of the visible spectrum between 400–700 nanometers for alternative optical filter configurations. Curve A represents an optical coating formed of a single layer of magnesium fluoride 26 deposited on a PET substrate 30, with an alumina layer 28 therebetween, as depicted in FIG. 3. The quarterwave optical thickness of the MgF$_2$ layer is about 550 nanometers. The integrated reflectance of this structure was calculated to be about 0.8% and the integrated transmittance was about 99% for this single antireflectance layer on the front surface of a plastic substrate.

Curve B of FIG. 8 represents a two-layer nonabsorbing optical coating having a layer 32 of achromatic material designated as M deposited over an aluminum oxide film formed on a plastic substrate, as illustrated in FIG. 4. The material M has an index of refraction of about 1.85, and may be cerium stannate, zirconium oxide or indium tin oxide, by way of example. The material M is formed to have a quarterwave optical thickness of about 850 nanometers. A MgF$_2$ layer 34 having a quarterwave optical thickness of about 500 nanometers is deposited on top. The integrated reflectance for this design was calculated to be about 0.25% and the integrated transmittance about 99%.

With reference to FIG. 5, an absorbing two-layer structure formed with a nickel thin film 36 having a physical thickness of about 2.0 nanometers and a thin film 36 of MgF$_2$ on top provides the characteristic of Curve C of FIG. 8. The MgF$_2$ layer is fabricated to have a quarterwave optical thickness of about 620 nanometers. The layers are deposited on an alumina film over a PET substrate 30 as described heretofore. The single period dark mirror optical filter of this design has an integrated reflectance of about 0.18% and an integrated transmittance of about 87%.

Curve D of FIG. 8 relates to the performance of a one period dark mirror optical filter having an achromatizing layer. The three layer structure which is illustrated in FIG. 6 includes a layer 40 of material M, such as cerium stannate or indium tin oxide, deposited on a PET substrate 30. The material has a quarter wave optical thickness at about 1060 nanometers and its index of refraction for this design is 2.05. A metallic thin film 42 of nickel having a thickness of about 1.3 nanometers is next deposited, followed by a layer 44 of MgF$_2$ having a quarter-wave optical thickness of about 510 nanometers. The layers 42 and 44 form a single period dark mirror and the M material serves as an achromatizing layer. The optical filter provides an integrated reflectance of about 0.09% and an integrated transmittance of about 91%.

The curve E of FIG. 3 depicts the performance of an optical filter incorporating a single period dark mirror and two one-half wave achromatizing layers, as shown in FIG. 7. The achromatizing structure is formed with a first layer of MgF$_2$ 46 on an Al$_2$O$_3$ layer 28 deposited on a PET substrate 30. A second achromatizing layer 48 of material M having an index of refraction of 2.05 is next deposited. A single period dark mirror consisting of a thin film 50 of nickel and a layer 52 of MgF$_2$ is formed on the M layer. The first MgF$_2$ layer 46 has a quarterwave optical thickness at about 1060 nanometers, whereas the second MgF$_2$ or top layer 52 has a quarter wave optical thickness at a design wavelength of about 515 nanometers. The nickel film 50 has a physical thickness of about 2.3 nanometers, and the M material 48 has a quarter wave optical thickness at 1066 nanometers. This optical coating structure provides an integrated reflectance of about 0.05% and an integrated transmittance of 84%, and is effective over a wide range of the visible spectrum.

It should be understood that the scope of the invention is not limited to the particular materials or configurations described above. For example, the thin film metal layers may consist essentially of nickel, molybdenum, chromium, tantalum, nichrome or inconel alloy, inter alia. If molybdenum is utilized for the metal layer, then the antireflectance layers are preferably formed from fused silica, which has an index of refraction of about 1.46. Also, the configuration of the optical filter can be flat or planar, or arcuate or curred in two dimensions to conform to or match the face of the display tube. To attain the desired shape, the PET substrate is thermoformed before or after deposition of the optical filter coatings.

When operating and viewing a cathode ray tube or other luminous display, it is highly desirable to have high contrast between the illuminated display elements and the dark background. This is particularly significant to computer operators who are looking at a multiplicity of alphanumeric characters over long periods of time, as well as television viewers. The optical coating filter of this invention enhances contrast as a result of the balance of light absorption and transmission effectuated by the selected materials acting in combination. To further enhance contrast of the display, the substrate is made of a dyed polyester, which may have a neutral gray hue. The dyed substrate provides a uniform attenuation across the light frequency band.

In an alternative approach to achieving enhanced contrast, the absorbing thin film metal layers are made to be thicker, which adds to the absorption realized with the metal layers.

What is claimed is:

1. An optical filter structure for use with a cathode ray tube or other luminous display comprising:
   a substantially transparent plastic substrate;
   first and second achromatizing layers successively deposited over said substrate;
   an adhesive layer of aluminum oxide disposed between said substrate and said achromatizing layers; and
   a single period dark mirror deposited over said achromatizing layers.

2. An optical filter structure as in claim 1, wherein said first achromatizing layer is made of magnesium fluoride and said second layer is made of a material selected from a group consisting primarily of cerium stannate, zirconium oxide and indium tin oxide.

3. An optical filter structure as in claim 1, wherein said single period dark mirror comprises a nickel thin film and a magnesium flouride layer deposited thereon.

4. In an optical filter assembly for enhancement of image contrast and for glare reduction of a luminous display, a flexible substantially transparent substrate formed of a thermo formed plastic having an index of refraction ranging from 1.5 to 1.8 and having front and rear surfaces with the front surface having a two-dimensional curvature, an adhesive hardcoat deposited on front surface of said substrate, a multilayer interference coating deposited on said adhesive hardcoat, said multilayer interference coating being comprised of at least two periods with each period being formed of a metal layer and a dielectric layer, said multilayer interference coating serving to enhance the display from the luminous display by balancing light absorption and transmission.

5. An assembly as in claim 4 wherein said dielectric layer is formed of magnesium flouride.

6. In an optical filter assembly for enchancement of image contrast and for glare reduction of a luminous display, a flexible, substantially transparent substrate formed of a thermoformed plastic having an index of refraction ranging from 1.5 to 1.8 and having front and rear surfaces, an adhesive hardcoat deposited on the front surface of said substrate, a multilayer interference coating deposited on said adhesive hardcoat, said multilayer interference coating being comprised of at least two periods with each period being formed of a metal layer and a dielectric layer, said multilayer interference coating serving to enhance the display from the luminous display by balancing light absorption and transmission, and an achromatizing layer disposed between the multilayer interference coating and the adhesive hardcoat.

7. An assembly as in claim 6 wherein said adhesive hardcoat layer is formed of aluminum oxide having an index of refraction of approximately 1.65.

8. An assembly as in claim 6 wherein said substrate has a thickness ranging from 0.003 to 0.007 inches.

9. An assembly as in claim 6 wherein said substrate is formed of a dyed polyester having a neutral gray hue.

10. An assembly as in claim 6 wherein said substrate is formed of polyethylene terephthalate.

11. An assembly as in claim 6 wherein said substrate is curved to conform to the contour of the luminous display.

12. An assembly as in claim 6 wherein said adhesive hardcoat has an optical thickness of about $\frac{3}{8}$ of a wavelength at a design wavelength of approximately 500 nanometers.

13. An assembly as in claim 6 wherein said metal layer is selected from a group of metals consisting primarily of nickel, molybdenum, chromium, tantalum, Nichrome and Inconel.

14. An assembly as in claim 6 wherein said metal is nickel.

15. In an optical filter assembly for enhancement of image contrast and for glare reduction of a luminous display, a flexible, substantially transparent substrate formed of a thermo-formed plastic having an index of refraction ranging from 1.5 to 1.8 and having front and rear surfaces, an adhesive hardcoat deposited on front surface of said substrate, a multilayer interference coating deposited on said adhesive hardcoat, said multilayer interference coating being comprised of at least two periods with each period being formed of a metal layer and a dielectric layer, said multilayer interference coating serving to enhance the display from the luminous display by balancing light absorption and transmission, and a layer of achromatizing material disposed between the hardcoat and the multilayer interference coating, said achromatizing material being selected from the group consisting primarily of cerium stannate, zirconium oxide and indium tin oxide.

16. An assembly as in claim 15 wherein said achromatizing material is selected from the group consisting primarily of cerium stannate, zirconium oxide and indium tin oxide.

17. In the combination of a luminous display cathode ray tube having a surface and an optical filter assembly disposed on the surface, the optical filter assembly comprising a flexible substantially transparent substrate formed of plastic and having an index of refraction U.S. Ser. No. 183,375 ranging from 1.5 to 1.8 and having front and rear surfaces with the front surface having two-dimensional curvature, an adhesive hardcoat layer deposited on said front surface, a multilayer interference coating deposited on said adhesive layer and conforming to the two dimensional curvature of the front surface, said multilayer interference coating comprising at least two periods with each period being comprised of a light absorbing thin metal layer and an antireflection layer.

18. In the combination of a luminous display cathode ray tube having a surface and an optical filter assembly disposed on the surface, the optical filter assembly comprising a flexible substantially transparent substrate formed of plastic and having an index of refraction ranging from 1.5 to 1.8 and having front and rear surfaces, an adhesive hardcoat layer deposited on said front surface, a multilayer interference coating deposited on said adhesive layer and conforming to the two dimensional curvature of the front surface, said multilayer interference coating comprising at least two periods with each period being comprised of a light absorbing thin metal layer and an antireflection layer, (37) said filter assembly including an achromatizing layer diposed between the multilayer interference coating and the adhesive hardcoat.

19. A combination as in claim 18 wherein said adhesive hardcoat layer is formed of aluminum oxide having an index of refraction of approximately 1.65.

20. A combination as in claim 18 wherein said substrate has a thickness ranging from 0.003 to 0.007 inches.

21. A combination as in claim 18 wherein said substrate is formed of a dyed polyester having a neutral gray hue.

22. A combination as in claim 18 wherein said substrate is formed of polyethylene terephthalate.

23. A combination as in claim 18 wherein said substrate is curved to conform to the contour of the luminous display cathode ray tube.

24. A combination as in claim 18 wherein said adhesive hardcoat has an optical thickness of about ⅜ of a wavelength at a design wavelength of approximately 500 nanometers.

25. A combination as in claim 18 wherein said metal layer is selected from a group of metals consisting primarily of nickel, molybdenum, chromium, tantalum, nichrome and inconcel.

26. A combination as in claim 18 wherein said metal is nickel.

27. A combination as in claim 18 wherein said antireflective layer is formed of magnesium fluoride.

28. A combination as in claim 18 wherein said achromatizing material is selected from the group consisting primarily of cerium stannate, zirconium oxide and indium tin oxide.

29. A combination as in claim 18 wherein the luminous display of the cathode ray tube has a curved surface and wherein the plastic is a thermoformed plastic which has been formed to conform to the curvature of the luminous display together with means for securing the optical filter assembly to the luminous display so that it is in close proximity thereto.

30. A combination of claim 18 together with a frame and means for mounting said optical filter assembly in said frame.

31. In a method for producing an optical filter assembly for enhancement of image contrast and for glare reduction of a luminous display from a cathode ray tube having a face plate which is curved in two dimensions, providing a flexible substantially transparent plastic substrate having an index of refraction ranging from 1.5 to 1.8 and having front and rear surfaces, depositing an adhesive hardcoat on the front surface of the substrate, depositing a multilayer interference coating on said adhesive hardcoat and thermoforming the plastic substrate after the interference coating has been deposited thereon to conform to the two-dimensional curvature of the cathode ray tube.

32. A method as in claim 31 together with the step of depositing an achromatizing layer on the adhesive hardcoat prior to deposition of the multilayer interference coating.

* * * * *